(12) United States Patent
Tanaka et al.

(10) Patent No.: US 11,062,452 B2
(45) Date of Patent: Jul. 13, 2021

(54) IMAGE PROCESSING APPARATUS, IMAGE PROCESSING METHOD AND NON-TRANSITORY COMPUTER-READABLE MEDIUM

(71) Applicants: CANON KABUSHIKI KAISHA, Tokyo (JP); CANON MEDICAL SYSTEMS CORPORATION, Otawara (JP)

(72) Inventors: Toru Tanaka, Funabashi (JP); Ryo Ishikawa, Kawasaki (JP)

(73) Assignees: Canon Kabushiki Kaisha, Tokyo (JP); Canon Medical Systems Corporation, Otawara (JP)

( * ) Notice: Subject to any disclaimer, the term of this patent is extended or adjusted under 35 U.S.C. 154(b) by 0 days.

(21) Appl. No.: 16/852,579

(22) Filed: Apr. 20, 2020

(65) Prior Publication Data

US 2020/0342602 A1 Oct. 29, 2020

(30) Foreign Application Priority Data

Apr. 26, 2019 (JP) .............................. JP2019-086506

(51) Int. Cl.
*G06K 9/00* (2006.01)
*G06T 7/00* (2017.01)

(52) U.S. Cl.
CPC .. *G06T 7/0014* (2013.01); *G06T 2207/30061* (2013.01)

(58) Field of Classification Search
None
See application file for complete search history.

(56) References Cited

U.S. PATENT DOCUMENTS

| | | | |
|---|---|---|---|
| 9,230,334 B2 | 1/2016 | Fujisawa et al. | |
| 10,102,622 B2 | 10/2018 | Ishikawa et al. | |
| 2008/0199048 A1* | 8/2008 | Eck | G06T 7/38 382/107 |
| 2009/0116719 A1* | 5/2009 | Jaffray | A61B 6/5217 382/131 |
| 2012/0250966 A1 | 10/2012 | Fujisawa et al. | |

(Continued)

FOREIGN PATENT DOCUMENTS

JP 2012-213604 A 11/2012

OTHER PUBLICATIONS

JP 2012/213604 A, US 2012/0250966 A1 U.S. Pat. No. 9,230,334 B2.

*Primary Examiner* — Atiba O Fitzpatrick
(74) *Attorney, Agent, or Firm* — Venable LLP (57) ABSTRACT

An image processing apparatus configured to acquire first registration information being registration information between a first image of interest, which is the first frame image in the frame image pair, and the first reference image; to acquire second registration information being registration information between a second image of interest, which is the second frame image in the frame image pair, and the second reference image; to acquire reference registration information being registration information between the first reference image and the second reference image; and to acquire third registration information being registration information between the first image of interest and the second image of interest, based on the first registration information, the second registration information and the reference registration information.

20 Claims, 4 Drawing Sheets

(56) References Cited

U.S. PATENT DOCUMENTS

| | | | |
|---|---|---|---|
| 2013/0039559 A1* | 2/2013 | Grass | G06T 7/32 |
| | | | 382/131 |
| 2014/0212014 A1* | 7/2014 | Kim | G06T 3/0068 |
| | | | 382/131 |
| 2016/0314587 A1 | 10/2016 | Ishikawa et al. | |
| 2018/0137634 A1* | 5/2018 | Fujiwara | G06T 7/00 |
| 2019/0000318 A1* | 1/2019 | Caluser | A61B 8/5261 |
| 2019/0012811 A1* | 1/2019 | Wang | G06T 11/008 |
| 2020/0327665 A1* | 10/2020 | Shimamura | A61B 5/113 |

* cited by examiner

IMAGE PROCESSING APPARATUS, IMAGE PROCESSING METHOD AND NON-TRANSITORY COMPUTER-READABLE MEDIUM

BACKGROUND OF THE INVENTION

Field of the Invention

The present invention relates to an image processing apparatus, an image processing method and a program.

Description of the Related Art

In the medical field physicians make diagnoses using medical images captured in accordance with various modalities. In particular when targeting a portion such as the lungs or heart where the movement of an organ shows the presence or absence of a disease, diagnosis may be performed using a moving image made up of time-series medical images. Modalities in which a three-dimensional tomographic image can be captured as a moving image (in a time series) include area detector-type X-ray CT apparatuses. Since the apparatus can capture a three-dimensional CT image as the moving image, the modality is also referred to as 4D-CT devices with an additional time axis. Images captured by such 4D-CT devices are also referred to as 4D-CT images.

Herein 4D-CT devices have a limited imaging range for one-shot, and hence in order to observe an organ that is larger than the imaging range, the image capture must be performed a plurality of times with moving the imaging range, and the results be integrated. For instance, Japanese Patent Application Publication No. 2012-213604 attempts to generate 4D-CT images of the entirety of the lungs through separate capture of 4D-CT images of the top and bottom of the lungs, and registration and combining three-dimensional images in which breathing phases are associated.

A problem arises in that in some instances there is no sufficient overlap region between images having a phase associated thereto, and as a result integration with sufficient precision may fail to be achieved.

SUMMARY OF THE INVENTION

It is an object of the present invention to provide an image processing apparatus that allows registration of two frame images with good precision, even in a case where there is no overlap region between frame images associated as a same phase.

The first aspect of the disclosure is an image processing apparatus, comprising: at least one memory; and at least one processor which function as: a first acquisition unit configured to acquire a first moving image and a second moving image resulting from imaging, in different imaging ranges, an object that performs a periodic motion between a first state and a second state; an association unit configured to acquire a frame image pair by selecting respective frame images having mutually corresponding phases, from a plurality of first frame images that make up the first moving image and a plurality of second frame images that make up the second moving image; a second acquisition unit configured to acquire, as a first reference image and a second reference image respectively, a first frame image and a second frame image each including at least a partial region of the object, as an overlap region, and having mutually different phases; and a third acquisition unit configured to acquire registration information for performing registration (alignment) of the frame image pair, wherein the third acquisition unit is further configured to: acquire first registration information being registration information between a first image of interest, which is the first frame image in the frame image pair, and the first reference image; acquire second registration information being registration information between a second image of interest, which is the second frame image in the frame image pair, and the second reference image; acquire reference registration information being registration information between the first reference image and the second reference image; and acquire third registration information being registration information between the first image of interest and the second image of interest, based on the first registration information, the second registration information and the reference registration information.

The second aspect of the disclosure is a computer-implemented image processing method, comprising: a first acquisition step of acquiring a first moving image and a second moving image resulting from imaging, in different imaging ranges, an object that performs a periodic motion between a first state and a second state; an association step of acquiring a frame image pair by selecting respective frame images having mutually corresponding phases, from a plurality of first frame images that make up the first moving image and a plurality of second frame images that make up the second moving image; a second acquisition step of acquiring, as a first reference image and a second reference image respectively, a first frame image and a second frame image each including at least a partial region of the object, as an overlap region, and having mutually different phases; and a third acquisition step of acquiring registration information for performing registration of the frame image pair, wherein the third acquisition step includes: a step of acquiring first registration information being registration information between a first image of interest which is the first frame image in the frame image pair and the first reference image; a step of acquiring second registration information being registration information between a second image of interest which is the second frame image in the frame image pair and the second reference image; a step of acquiring reference registration information being registration information between the first reference image and the second reference image; and a step of acquiring third registration information being registration information between the first image of interest and the second image of interest, based on the first registration information, the second registration information and the reference registration information.

The present invention allows increasing registration precision between two frame images even in a case where there is no overlap region between frame images associated as a same phase.

Further features of the present invention will become apparent from the following description of exemplary embodiments with reference to the attached drawings.

DESCRIPTION OF THE EMBODIMENTS

Preferred embodiments of the image processing apparatus according to the present invention will be explained next with reference to accompanying drawings. However, the scope of the invention is not limited to the illustrated examples.

First Embodiment

An image processing apparatus according to the present embodiment integrates three-dimensional moving images (first moving image and second moving image) for divided regions each captured a plurality of times, such that the integrated image encompasses the entirety of the region including an organ that performs a periodic movement.

The image processing apparatus of the present embodiment acquires a first moving image and a second moving image, resulting from division and capture of a region to be observed, so that there is overlap of at least part of the region. A three-dimensional tomographic image (still images) captured at each point in time (each frame) and that makes up each of the moving images will be referred to as a frame image. In the image processing apparatus of the present embodiment, frame images having similar phase information of the movement of the organ, between the first moving image and the second moving image, are associated as frame images of a same phase. Through combination of frame images associated as a same phase there is generated a combined image of the same phase. An image that includes the entirety of a region to be observed can be acquired at a plurality of points in time through generation of a combined image at the plurality of points in time.

If the manner of movement of the observation target is exactly the same between the first moving image and the second moving image, and the frame images are associated correctly (that is, the frame images of a same phase are associated), then the frame images can be combined, without positional deviation, on the basis of information about the imaging range of the respective moving images. In actuality, however, positional deviations arise on account of differences in the manner in which the observation target moves, between the first moving image and the second moving image, or on account of phase differences between frame images associated as a same phase. In order to eliminate the above positional deviation it is necessary to perform registration between frame images associated as a same phase, for instance on the basis of a degree of similarity between overlapping observation regions.

Depending on the way in which the observation target moves, however, the overlap of the observation region between frame images associated as a same phase may be insufficient or completely lacking. In the present embodiment, therefore, frame images at which the region to be observed overlaps and in which phases are different from each other are selected from the first moving image and the second moving image. Hereafter, the selected frame image among the first moving images will be referred to as first reference image, and the selected frame image among the second moving images will be referred to as second reference image. A set (pair) of the two reference images will be referred to as a reference image pair. Herein registration information (relative positional relationship) between a frame image and a reference image within each moving image is calculated, and registration information between the first reference image and the second reference image is calculated. A set of the registration information is used for calculating registration information between frame images associated as a same phase between the first moving image and the second moving image. As a result it becomes possible to calculate registration information, also in the case of insufficient or lacking observation region overlap between a frame image (first image of interest) of the first moving image and a frame image (second image of interest) of the second moving image associated as a same phase.

The configuration of and processing in the present embodiment will be explained next with reference to FIG. 1 through FIG. 5. In the present embodiment an example will be explained of a three-dimensional moving image resulting from imaging the respiratory movements of the lungs. The embodiments of the present invention are not limited thereto, and the moving image may be a moving image obtained by imaging any portion that performs a periodic movement spontaneously, such as the heart. In addition, the moving image may be a moving image resulting from imaging of any portion where a subject performs a periodic motion (for instance bending and stretching exercises).

Figure 1:
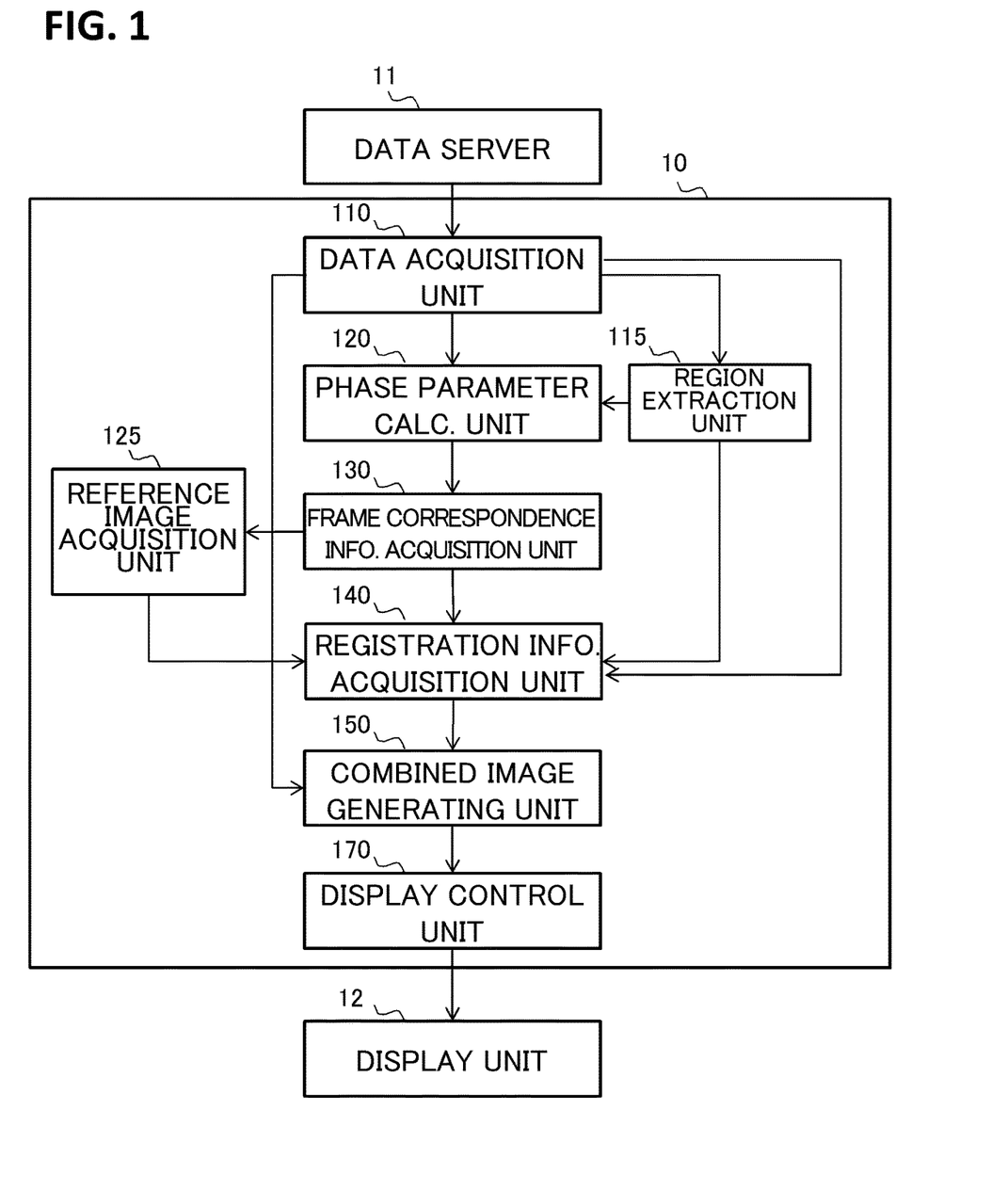
FIG. 1 is a diagram illustrating the device configuration of an image processing apparatus according to an embodiment.

FIG. 1 illustrates the configuration of an image processing apparatus 10 according to the present embodiment. As depicted in the figure, an image processing apparatus 10 of the present embodiment is communicably connected to a data server 11.

The data server 11 holds a first moving image and a second moving image. The first moving image and the second moving image are moving images (also referred to as three-dimensional moving images or four-dimensional images) made up of three-dimensional tomographic images at a plurality of points in time, and obtained by capturing beforehand different imaging ranges of a same subject in accordance with a same modality. The first moving image and the second moving image are captured at different times. Modalities for capturing three-dimensional tomographic images include for instance MRI devices, X-ray CT devices, three-dimensional ultrasonic imaging devices, photoacoustic tomography devices, PET/SPECTs and OCT devices. The first moving image and the second moving image are inputted to the image processing apparatus 10 via a data acquisition unit 110.

A display unit 12 is a monitor that displays images generated by the image processing apparatus 10.

The image processing apparatus 10 is made up of the following constituent elements. The data acquisition unit 110 acquires the first moving image and the second moving image inputted to the image processing apparatus 10. A region extraction unit 115 extracts a region of a target organ in each frame of the first moving image and of the second moving image. The phase parameter calculation unit 120 acquires a first phase parameter denoting phase information about the movement of the organ, in each frame of the first moving image, and a second phase parameter denoting phase information about the movement of the organ in each frame of the second moving image. The reference image acquisition unit 125 acquires a first reference image from the first moving image and a second reference image from the second moving image, on the basis of the first phase parameter and the second phase parameter. The frame correspondence information acquisition unit 130 acquires correspondence information of each frame image of the first moving image and the second moving image, on the basis of the first phase parameter and the second phase parameter. That is, each frame image (second frame image) of the second moving image is associated with a respective frame image (first frame image) of the first moving image. The registration information acquisition unit 140 acquires first registration information denoting registration information between each frame image of the first moving image and the first reference image, and second registration information denoting registration information of each frame image of the second moving image and the second reference image. The registration information acquisition unit 140 further acquires registration information (reference registration information) between the first reference image and the second reference image. Alignment information (third registration information) between arbitrary frame images associated as a same phase is acquired on the basis of the reference registration information, the first registration information and the second registration information. The combined image generating unit 150 generates a combined image through combination of the first frame image and the second frame image associated as a same phase, on the basis of the third registration information. The display control unit 170 performs display control of displaying the combined image on the display unit 12.

The image processing apparatus 10 has a central processing unit (CPU) and a memory, as hardware elements. The above various functions are realized by the CPU through execution of a program stored in the memory. The above functions need not be realized by just one CPU, and may be realized by a plurality of CPUs. The above functions may also be realized, in addition to or instead of a CPU, by other processors, for instance a graphical processing unit (GPU), an application specific integrated circuit (ASIC), a programmable logic device, a field programmable gate array (FPGA) or the like.

Figure 2:
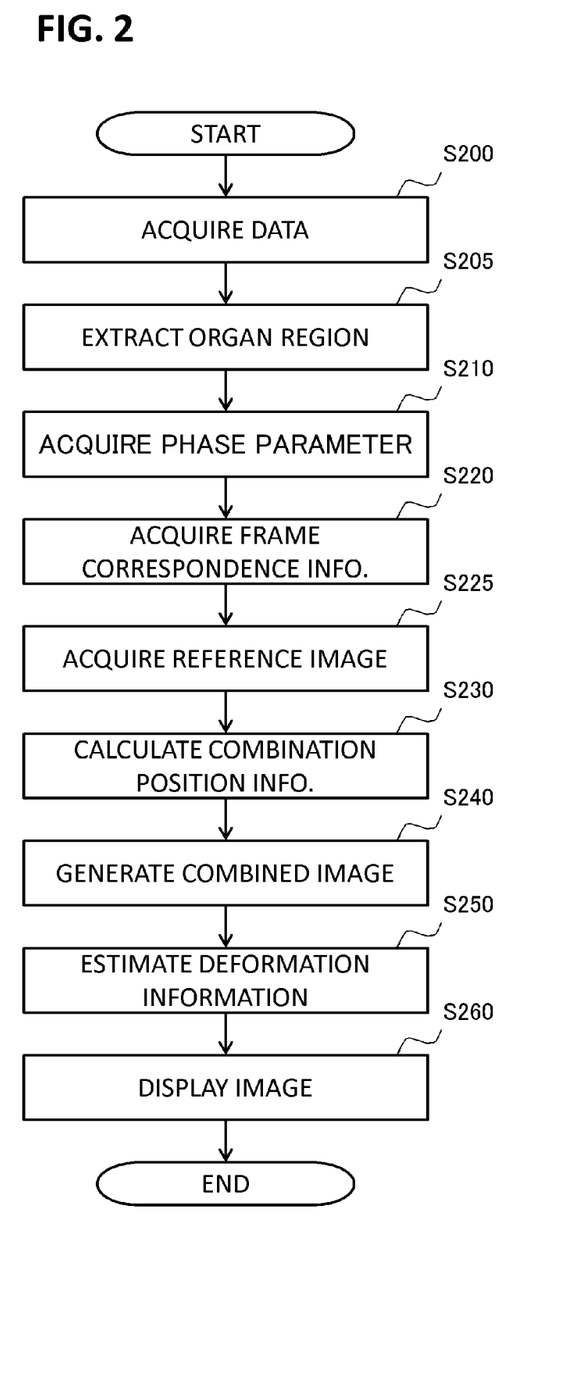
FIG. 2 is a flow diagram illustrating an overall processing procedure in an embodiment.

FIG. 2 illustrates a flowchart of the entire processing procedure executed by the image processing apparatus 10. Each step will be explained in detail next.

(S200: Data Acquisition) In step S200 the data acquisition unit 110 acquires a first moving image and a second moving image that are inputted to the image processing apparatus 100. The data acquisition unit 110 outputs the acquired first moving image and second moving image to the region extraction unit 115, the phase parameter calculation unit 120, the registration information acquisition unit 140 and the combined image generating unit 150.

The lungs will serve as the target organ in the present embodiment. Moving images resulting from capture of the lungs that perform a periodic motion between a maximal expiratory position (first state) and a maximal inspiratory position (second state) will be herein the first moving image and the second moving image. The first moving image and the second moving image are moving images resulting from capture of an object over different ranges, and are obtained by dividing and capturing the lungs in the craniocaudal direction, such that there is at least overlap of at least a partial region of the lungs. Herein an image of the top of the lungs, including the lung apex, is the first moving image and an image of the bottom of the lungs, including the lung base, is the second moving image.

The first moving image and the second moving image are envisaged to be moving images resulting from capture of motion over a plurality of cycles, but may be herein moving images resulting from capture of motion over at least a half cycle (for instance motion from the maximal inspiratory position to the maximal expiratory position or vice versa).

(S205: Organ Region Extraction) In step S205 the region extraction unit 115 extracts a target organ region in each frame of the first moving image and the second moving image. The region extraction unit 115 outputs information about the extracted region to the phase parameter calculation unit 120 and the registration information acquisition unit 140.

A known image processing method can be used in extraction processing of an organ region from an image. Examples of image processing methods that can be used include well-known segmentation processing such as arbitrary threshold value processing that utilizes threshold values of pixel values, as well as graph cut processing. Extraction of an organ region can be carried out manually by a user. For instance, the user may extract (designate) a lung region manually, using drawing software, not shown; also, the user may correct manually a lung region extracted in accordance with a known image processing method.

(S210: Phase Parameter Calculation) In step S210, the phase parameter calculation unit 120 calculates the first phase parameter denoting phase information about the periodic motion of the target organ (lung respiratory movements in the case of the lungs), through analysis of the first moving image. Similarly, the phase parameter calculation unit 120 calculates the second phase parameter denoting phase information about periodic motion of the target organ, through analysis of the second moving image. The phase parameter calculation unit 120 outputs the calculated first phase parameter and second phase parameter to the frame correspondence information acquisition unit 130.

In the present embodiment, the phase parameter calculation unit 120 calculates, as the first phase parameter, a numerical value that is correlated with the periodic motion of the target organ, from each frame image (still image at each point in time) included in the first moving image. In a case for instance where the target organ is the lungs, the volume of lungs included in each frame image is measured, using the lung region extracted in step S205, and the magnitude of lung volume in each frame image is set as the first phase parameter, given that lung volume varies in conjunction with respiratory movements. Alternatively, the magnitude of lung surface area within a predetermined slice plane may be used as the first phase parameter. It is known that, in CT images, pixel values of an air region within a lung region change with lung volume. Accordingly, the first phase parameter may be calculated on the basis of distribution information about pixel values within the lung region included in each frame image. The information is not limited to information that can be acquired from the lungs, and the first phase parameter may be calculated using information about a portion linked to respiratory movements. For instance, the first phase parameter may be calculated on the basis of the movement of the body surface at the chest/abdomen, or on the basis of the movement of another organ. Further, the first phase parameter may be calculated by integrating a plurality of information items linked to respiratory movements. Similarly to the first phase parameter, the second phase parameter is acquired through analysis of the second moving image. However, the first phase parameter and the second phase parameter need not necessarily be calculated in accordance with the same method.

The image processing apparatus 10 may be configured to acquire phase parameters from an external device, not shown. For instance, a ventilation amount of the subject may be measured with a spirometer simultaneously with capture of a moving image, whereupon the image processing apparatus 10 acquires the measured value as the phase parameter. Alternatively, the movement of the body surface of the subject at the time of capture of a moving image may be measured using a laser sensor or a pressure sensor, whereupon the image processing apparatus 10 acquires the measured value as a phase parameter. Further, the user may manually input a phase parameter of each frame image into the image processing apparatus 10.

(S220: Acquisition of Frame Correspondence Information) In step S220, the frame correspondence information acquisition unit 130 associates frame images of the first moving image and the second moving image having a similar phase, on the basis of the first phase parameter and the second phase parameter, and acquires the association result as frame correspondence information. The term frame correspondence information refers herein to information denoting which frame image of the first moving image and which frame image of the second moving image have a most similar phase. The term frame correspondence information can also be regarded as information denoting an associated frame image pair. The frame correspondence information acquisition unit 130 acquires also, as frame correspondence information, information denoting which image pair corresponds to a phase peak (maximal inspiratory position and maximal expiratory position in the case of the lungs). The frame correspondence information acquisition unit 130 outputs the acquired phase correspondence information to the reference image acquisition unit 125, the registration information acquisition unit 140 and the combined image generating unit 150.

A concrete explanation follows next on an example of an instance where the target organ is the lungs and the first phase parameter and the second phase parameter are calculated on the basis of lung volume. Ventilation amounts in the first moving image and the second moving image are not necessarily similar, even if lung volumes are similar, since the lung regions included in the images are dissimilar. Accordingly, correct association cannot be achieved when associating frame images having similar phase parameter values. The parameters are therefore normalized so that the value of the first phase parameter of the frame image with the maximum volume in the first moving image is set to 1, and the first phase parameter of the frame image with the minimum volume is set to 0. The second phase parameter is likewise normalized to a range from 0 to 1. The frame image having the second phase parameter most similar to the normalized first phase parameter can be associated with a predetermined frame image of the first moving image. The frame image for which the value of the normalized phase parameter is 1 represents a maximal inspiratory position, and the frame image for which the value is 0 represents the maximal expiratory position, both for the first moving image and the second moving image.

Frame image association may be performed on the basis of the first phase parameter and second phase parameter not having been normalized. In a case for instance where the first phase parameter and the second phase parameter are calculated using approximately the same portion of the subject between the first moving image and the second moving image, frames (points in time) having similar phase parameters can be associated, without normalization, as frames having similar ventilation amounts. Specifically, a device coordinate system that can be acquired on the basis of header information about the moving images is used for acquiring, as the first phase parameter and the second phase parameter, a body surface position on the chest/abdomen at a position at which the device coordinate system is the same on the first moving image and the second moving image. In this case frame images having similar phase parameters (i.e. close body surface positions) between the first moving image and the second moving image may be associated, without normalization of the phase parameters.

An example of a result of association using phase parameters will be specifically illustrated next. An instance will be exemplified in which the number of frames of the first moving image and the second moving image is 5, the first phase parameter is {0.0, 0.3, 0.6, 0.8, 1.0}, sequentially from the first frame, and the second phase parameter is {0.0, 0.5, 0.6, 0.8, 1.0}. In the case of association with a respective frame having the most similar second phase parameter, taking the first phase parameter as a reference, the respective frames of the first moving image and the second moving image are sequentially associated, one-to-one, from the first frame, with the number of associated frames being 5. In a case where the second phase parameter is taken as a reference, the second frame (0.5) and the third frame (0.6) of the second phase parameter are both associated with the third frame (0.6) of the first phase parameter, with the number of associated frames being 5. In a case where all the phase parameters of a plurality of frames of one of the moving images are most similar to a same frame of the other moving image, then there may be associated only the pair with most similar phase parameters. In this case, the remaining unassociated frames may be associated with frames having a second and subsequent similar phase parameters in the other moving image, or may remain unused, without being associated, in subsequent steps. If in a case where unused frames are not associated in the case where the second phase parameter is taken as a reference in the example described above, then the second frames of the first phase parameter and of the second phase parameter are not associated, and thus the number of associated frames is herein 4.

(S225: Reference Image Acquisition) In step S225, the reference image acquisition unit 125 acquires (selects) a first reference image from the first moving image and a second reference image from the second moving image, on the basis of the frame correspondence information, to yield a set of frame images (reference image pair) from the acquired frame images. The first reference image and the second reference image are established as a set of frame images that include at least a partial region of the target organ as an overlap region. The reference image acquisition unit 125 outputs information about the acquired first reference image and second reference image to the registration information acquisition unit 140.

In the present embodiment, the reference image acquisition unit 125 acquires, as a reference image pair, frame images having mutually different phases in the first moving image and the second moving image. This is because the region captured in each frame image of the first moving image and of the second moving image is different depending on the periodic motion of the organ, and a region captured overlappingly in both frame images, of a pair thereof, of a different phase is larger than the region captured overlappingly in both frame images, of a pair thereof, of a same phase.

Figure 3:
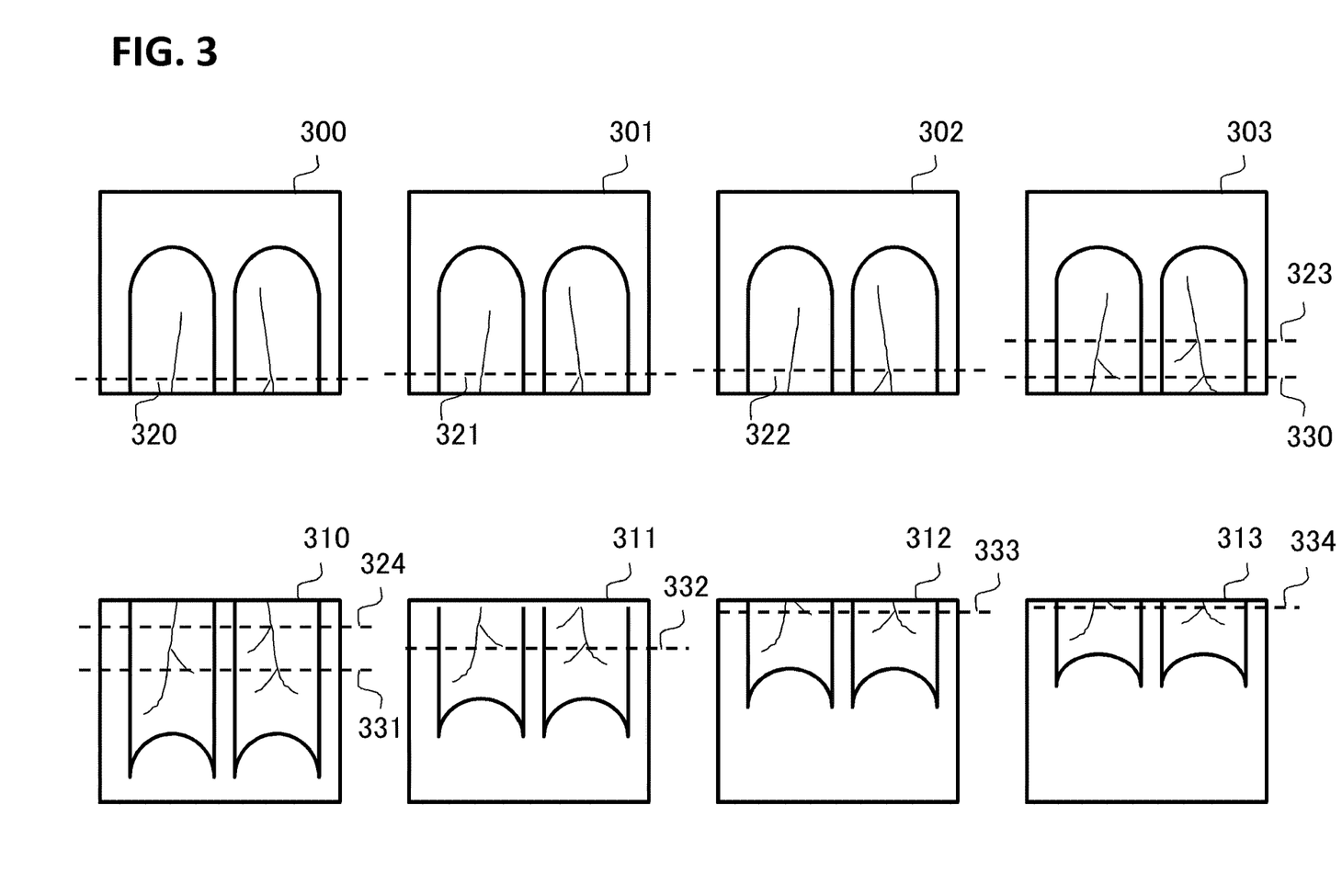
FIG. 3 is a diagram illustrating an example of position information in an embodiment.

This will be explained specifically with reference to FIG. 3. Image 300 through image 303 depict frame images from a maximal inspiratory position (second state) up to a maximal expiratory position (first state) in the first moving image. Image 310 through image 313 depict frame images from the maximal inspiratory position up to the maximal expiratory position in the second moving image. Lung respiratory movements in the craniocaudal direction are small on the lung apex end, but are relatively larger on the lung base end as compared with those at the lung apex. As illustrated in FIG. 3, in the first moving image resulting from capture of the top of the lungs, the density of lung tissue increases and the proportion of a lung region included in the frame images tends to increase, with increasing proximity of the lung base to the lung apex. Therefore, the proportion of a lung region included in the frame image of the maximal inspiratory position is smallest, and the proportion of the lung region included in frame images increases with increasing proximity to the maximal expiratory position, such that the proportion of the lung region becomes highest at the maximal expiratory position. In contrast to the first moving image, in the case of the second moving image resulting from capture of the bottom of the lungs, the proportion of a lung region included in the frame image of the maximal inspiratory position is largest, and the proportion of the lung region included in the frame images decreases with increasing proximity to the maximal expiratory position, such that the proportion of the lung region becomes lowest at the maximal expiratory position. Therefore the combination of highest likelihood of an overlap region being largest is herein a combination of frame images at the maximal expiratory position in the first moving image and at the maximal inspiratory position in the second moving image, which have the highest proportions of lung region included in the frame images. Therefore, the reference image acquisition unit 125 acquires these frame images as a first reference image and a second reference image, respectively. Instead of selecting a reference image thus on the basis of a presumption, a combination of a frame image in the first moving images and a frame image in the second moving image that yield the largest overlap region may be selected, on the basis of a similarity degree between images, and be taken as the first reference image and the second reference image.

The reference image is not limited to frame images of the maximal inspiratory position and the maximal expiratory position, and may be some other frame image. For instance a predetermined phase between the maximal expiratory position and the maximal inspiratory position, associated in step S220, may be set as a phase of interest, and frame images of a phase before and a phase after the phase of interest may be selected as the first reference image and the second reference image. Specifically, a frame image closer to the maximal expiratory position (of large lung region) by a predetermined number of frames (time) than a frame image of the phase of interest may be selected, in the first moving image, as the first reference image. A frame image (of large lung region) closer to the maximal inspiratory position by a predetermined number of frames than the above phase of interest may be selected, in the second moving image, as the second reference image. In this case, the predetermined number of frames need not be identical between the first moving image and the second moving image, and may be 0 for one of the foregoing. In the case of a moving image from expiration to inspiration (when inhaling) the frame images may be selected so that the first reference image has a phase that precedes slightly the second reference image. In the case conversely of a moving image from inspiration to expiration (when exhaling) the frame images may be selected so that the first reference image has a phase that lags slightly the second reference image. That is, each reference image may be selected by shifting the phase so that an overlap region is obtained, on the basis of the direction of motion of the target organ. Such being the case, frame images having a similar ventilation amount can be selected as the first reference image and the second reference image, as compared with a case where a frame image at the maximal expiratory position in the first moving image and a frame image at the maximal inspiratory position in the second moving image are selected as reference images. Shapes and pixel values of a lung region in the frame images are similar by virtue of the fact that the ventilation amount is similar; as a result, an effect is elicited in that there is increased the precision of calculation of reference registration information between the first reference image and the second reference image in subsequent steps. For instance an intermediate phase between the maximal expiratory position and the maximal inspiratory position can be used as the phase of interest. The phase of interest may be a phase other than an intermediate phase so long as the phase of interest sufficiently includes frame images of a phase close to the maximal expiratory position and a phase close to the maximal inspiratory position.

Another concrete example will be explained next of acquisition, as a reference image, of frame images other than at the maximal inspiratory position or the maximal expiratory position.

For instance, a reference image may be acquired on the basis of an image similarity degree between a frame image of a phase of interest and another frame image. As a result, it becomes possible to acquire, as a reference image, a frame image having a lung shape more similar to that of a phase of interest than that at the maximal expiratory position or the maximal inspiratory position, and as a result an effect is elicited of enhanced precision of calculation at the time of calculating reference registration information between the first reference image and the second reference image in subsequent steps.

For the first moving image, for instance a frame image whose image similarity degree to the frame image of the phase of interest in the first moving image is highest, from among frame images closer to the maximal expiratory position than the phase of interest, may be acquired as the first reference image. For the second moving image, similarly, a frame image whose image similarity degree to the frame image of the phase of interest in the second moving image is highest, from among the frame images closer to the maximal inspiratory position than the phase of interest, may be acquired as the second reference image.

Alternatively, an image similarity degree between the first moving image and the second moving image may be used herein. For instance, a frame image whose similarity degree to a frame image of the phase of interest of the second moving image is high may be searched, and used as the first reference image, from among the frame images from between the phase of interest up to the maximal expiratory position, of the first moving image. The similarity degree between the first moving image and the second moving image can be calculated as follows. Specifically, a slice of the second moving image, on the lung apex end of the frame images of the phase of interest is selected, a corresponding slice is worked out from the frame images of the first moving image, and an image similarity degree between these corresponding slice images is calculated as a similarity degree of the first frame image and the second frame image. Herein a frame image of the phase of interest of the second moving image may be acquired as the second reference image; alternatively, the second reference image may be acquired using an image similarity degree between the first moving image and the second moving image, as in the case of the first reference image. That is, a frame image whose similarity degree to frame images of the phase of interest of the first moving image is high may be searched, and selected as the second reference image, from among frame images from between the phase of interest of the second moving image up to the maximal inspiratory position.

Instead of using a frame image of highest image similarity degree as the reference image, any frame image having an image similarity degree equal to or greater than a threshold value may be acquired as the reference image. For instance either one from among the size of the overlap region and image quality may be used as the selection criterion.

The reference image may be acquired on the basis of image quality, instead of image similarity degree. A frame image of high image quality can be acquired as the reference image, instead of a frame image of low image quality having a motion artifact therein. As a result, this improves the precision of the calculation of reference registration information between the first reference image and the second reference image in subsequent steps. For instance a frame image of best image quality from among the frame images, in the first moving image, closer to the maximal expiratory position than the phase of interest, is acquired as the first reference image. Similarly, a frame image of best image quality from among the frame images, in the second moving image, closer to the maximal inspiratory position than the phase of interest, may be acquired as the second reference image. Image quality can be evaluated on the basis of at least any one of for instance sharpness, contrast and noise amount.

Further, any one frame image having image quality equal to or greater than a threshold value may be acquired as the reference image, instead of using the frame image of best image quality as the reference image. For instance at least either one from among the size of the overlap region and image similarity degree may be used as the selection criterion.

In a case where another frame image is used as the reference image, frame images of similar ventilation amount can be selected as the first reference image and the second reference image, but herein the overlapping region between the first reference image and the second reference image is smaller than in a case where the maximal inspiratory position and the maximal expiratory position are used as the reference image. If the overlapping region is small, the precision of the reference registration information between the first reference image and the second reference image, calculated in subsequent steps, may be low. Therefore, the first reference image and the second reference image may be selected for instance on the basis of both ventilation amount similarity and the size of the overlapping region. For instance, the image similarity degree to the phase of interest can be used as an evaluation factor of ventilation amount similarity, and the magnitude of the proportion of a lung region worked out through calculation of lung volume can be used as the evaluation factor of the size of the overlapping region. The reference image may be selected on the basis of an evaluation value resulting from weighted addition of both evaluation factors. The evaluation factors are not limited to a combination of ventilation amount similarity and overlapping region size, and a plurality of any evaluation factors may be combined herein. For instance the reference image may be acquired on the basis of evaluation factors of overlapping region size and image quality. In other words, the first reference image and the second reference image may be determined by using, as evaluation factors, a plurality of items from among the size of an overlap region between images, a degree of similarity between images, and image quality.

In the present embodiment an example has been explained of an instance where respective single frame images are selected as the first reference image and as the second reference image. However, there may be selected a plurality of respective first reference images and second reference images, whereupon processing proceeds to the next step. For instance, both the maximal expiratory position of the first moving image and another frame image between the phase of interest and the maximal expiratory position may be acquired as the first reference image, and both the maximal inspiratory position of the second moving image and another frame image between the phase of interest and the maximal expiratory position may be acquired as the second reference image. Alternatively, a plurality of frame images of just any one of the reference images alone may be selected herein.

(S230: Calculation of Combination Position Information)

In step S230, the registration information acquisition unit 140 calculates a relative positional relationship (reference registration information) between the first reference image and the second reference image. Further, the registration information acquisition unit 140 calculates a positional relationship (first registration information) between the first reference image and each frame image of a first moving image other than the first reference image, and a positional relationship (second registration information) between the second reference image and each frame image of a second moving image other than the second reference image. Positioning information for combining frame images having a phase associated therewith in the first moving image and the second moving image is calculated as third registration information on the basis of the above reference registration information, first registration information and second registration information. The calculated third registration information is outputted to the combined image generating unit 150.

The reference registration information is information denoting which position, on the second reference image, one or a plurality of positions on the first reference image correspond to. The first registration information is information denoting which position, on the other frame image of the first moving image, the one or a plurality of positions on the first reference image correspond to. Similarly, the second registration information is information denoting which position on the other frame image of the second moving image the one or a plurality of positions on the second reference image correspond to. The third registration information is information denoting a positional relationship between associated frame images. The details of a method for calculating respective registration information will be explained next.

Firstly, the registration information acquisition unit 140 calculates a position on the second reference image corresponding to a predetermined position on the first reference image, as reference registration information. For instance with $P1\_i$ as an i-th slice position of the first reference image, there is searched a j-th slice position $P2\_j$ in the second reference image corresponding to the slice position $P1\_i$ in the first reference image. The slice position $P2\_j$ in the second reference image, being a position corresponding to the slice position $P1\_i$ in the first reference image, is held as reference registration information. The slice position $P1\_i$ is preferably selected within the overlap region of the first reference image and the second reference image. The reference registration information may be calculated not as a slice position, but be calculated as the position of a pixel on the second reference image corresponding to a pixel on the slice position $P1\_i$ in the first reference image.

Next, the registration information acquisition unit 140 calculates first registration information between the first reference image and frame images of the first moving image other than the first reference image, in accordance with a similar method. In this case, the first registration information may be calculated through comparison of the first reference image against all the frame images of the first moving image other than the first reference image. Alternatively, there may be calculated registration between adjacent frame images may be carried out and registration information between the images, whereupon the calculated registration information items are integrated chronologically, to thereby acquire registration information between the first reference image and the other frame image. The registration information acquisition unit 140 calculates also the second registration information similarly to the first registration information.

The registration information can be calculated as a result of a search so that pixels denoting a same position between two frame images substantially match each other, by resorting to a known image processing method. For instance a slice position is searched for which an image similarity degree between tomographic images at a predetermined slice position is high. As the image similarity degree there can be used a known method ordinarily utilized, such as a sum of squared differences (SSD), mutual information, or cross-correlated coefficients.

A method for calculating the third registration information will be explained next with reference to FIG. 3. In FIG. 3 it is assumed that there is no lung region overlap in image 302 and image 312. An example of the calculation of the third registration information between image 302 and image 312 in this case will be explained next. The frame images of image 300 and image 310, image 301 and image 311, image 302 and image 312, and image 303 and image 313, are herein assumed to have respective phases associated thereto, and image 303 is selected as the first reference image, and image 310 is selected as the second reference image. Further, dotted lines 320, 321, 322, 323 and 324 denote respective corresponding slice positions, and dotted lines 330, 331, 332, 333 and 334 denote respective corresponding slice positions. The language "corresponding slice positions" signifies positions of slices in which substantially a same portion of the subject is rendered.

In this case, the reference registration information indicates for instance that slice position 330 in the first reference image 303 corresponds to slice position 331 in the second reference image 310. The first registration information indicates for instance that slice position 330 in the first reference image 303 corresponds to slice positions 320 to 323 in other frame images 300 to 302 in the first moving image. Slice position 330 may be prescribed to be a slice included in a frame image (image 300) at the maximal inspiratory position for which the ratio of a lung region in the first moving image is minimal. That is because the slice included in frame image 300 for which the lung region ratio is minimal is also included in the other frame images 301 to 303. Similarly, the second registration information indicates for instance that slice position 331 in the second reference image 310 corresponds to slice positions 332 to 334 of other frame images 311 to 313 in the second moving image. Slice position 331 may be prescribed to be a slice included in a frame image (image 313) at the maximal expiratory position for which the ratio of the lung region in the second moving image is minimal. That is because the slice included in frame image 313 for which the lung region ratio is minimal is also included in other frame images 311 to 313.

The third registration information is information denoting a positional relationship between frame images having a phase associated thereto. The registration information acquisition unit 140 calculates the third registration information between arbitrary frame images having a phase associated thereto, by using the calculated reference registration information, the first registration information and the second registration information. For instance, the registration information between image 302 and image 312 is calculated using the positional relationship between image 302 and the first reference image 303, the relative positional relationship between the first reference image 303 and the second reference image 310, and the positional relationship between the second reference image 310 and image 312. That is, image 302 can be converted to image 312 as a result of a combination of conversion of image 302 to image 303, conversion of image 303 to image 310, and conversion of image 310 to image 312.

Through acquisition of the third registration information it becomes possible to determine whether any regions in the lungs overlap or not in a frame image pair having a phase associated thereto, between the first moving image and the second moving image. Defining for instance Sn as the number of slices between slice position 323 and slice position 330 of image 303, it becomes possible to determine whether there is overlap or not on the basis of the presence or absence of a number of slices equal to or greater than Sn, between slice position 322 and slice position 333, in image 302 and image 312. Thus, it becomes possible to determine that there is no overlap in any lung region between images 302 and 312 in a case where the sum of the number of slices on the lung base end from slice position 322 included in image 302 and the number of slices on the lung apex end from slice position 333 included in image 312 does not satisfy Sn. The two slice positions 323 and 330 in image 303 are selected so as to be included in different images of a frame image pair at another point in time. That is, slice position 323 is selected so as to be present in frame image 302, and slice position 330 is selected so as to be present in frame image 312.

Also the reliability of the calculated positional relationship can be calculated as the third registration information. The movement of the lungs in the craniocaudal direction, from the maximal inspiratory position to the maximal expiratory position, is substantially one direction. Accordingly, in a case for instance where the i-th slice position in the first reference image and the j-th slice position in each frame image in the second moving image correspond to each other, it can be expected that the value of j changes monotonically in one direction, or does virtually not change, in accordance with the degree of similarity of the phase parameter with respect to the reference image. Specifically, the slice position in frame images 310 to 313 corresponding to slice position 330 in the first reference image 303 changes monotonically with changes in phase. Thanks to this characteristic, it becomes thus possible to determine that a calculation result of the positional relationship between a reference image and frame images thereof is very likely erroneous, and that reliability is low, in a case for instance where one given frame alone exhibits a significantly different position from that in other frames. Reliability can be calculated on the basis of the value of a second derivative of a combination position calculated over consecutive frames. For instance, a value inversely proportional to the value of the second derivative (a value proportional to the degree of reliability) can be used herein as the reliability.

In a case where in step S225 a plurality of frame images is selected as the reference image, reference registration information is worked out for respective combinations of the first reference image and the second reference image. Provisional registration information items for combining frame image pairs are acquired in accordance with the combinations of the first reference image and the second reference image, and the acquired registration information items are integrated, to thereby acquire final third registration information. In a case for instance where there are N first reference images and M second reference images, there are worked out N×M reference registration information items. Thus, M×N provisional registration information items for combining each frame image having a phase associated thereto are calculated by using the foregoing reference registration information items. Then the provisional registration information item having highest reliability, from among the plurality of provisional registration information items, is established as the third registration information, and processing proceeds to the next step. Alternatively, an average of the provisional registration information items may be taken as the third registration information. The average may be herein a simple average, or a weighted average using weights according to reliabilities of the provisional registration information items. The reference registration information may be worked out not for all N×M combinations, but for some combinations among the foregoing.

(S240: Combined Image Generation) In step S240, the combined image generating unit 150 generates a combined image resulting from combining the first frame image and the second frame image, on the basis of the third registration information calculated in step S230. The generated combined image is outputted to the display control unit 170. The combined image may be generated for all the frame image pairs having a phase associated thereto; alternatively a combined image may be generated for only some frame image pairs.

Figure 4:
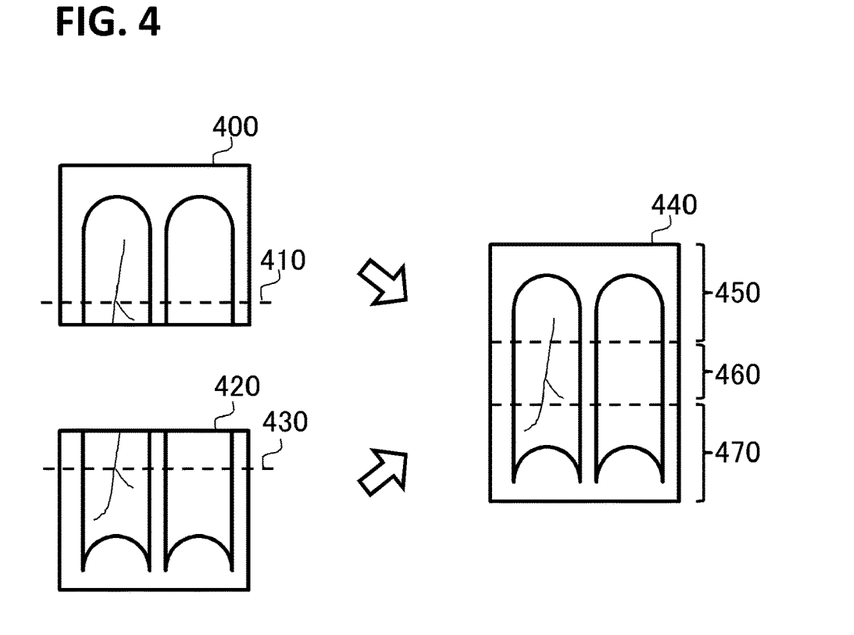
FIG. 4 is a diagram illustrating an example of a combination position in an embodiment.

A method for generating a combined image in a case where there is an overlap region between the first frame image and the second frame image will be explained first. The combined image generating unit 150 generates a combined image through combination so that a position on the first frame image and a corresponding position on the second frame image overlap each other, on the basis of the third registration information calculated in step S230. This will be explained specifically with reference to FIG. 4. In FIG. 4, image 400 represents a coronal section of the first frame image, and dashed line 410 represents a slice position P1_$i$. Image 420 represents a coronal section of the second frame image, and dashed line 430 represents a slice position P2_$j$ corresponding to the slice position P1_$i$ calculated in step S230. Image 440 represents a combined image resulting from translation of the second frame image in the slice direction, and combination, so that the slice position P1_$i$ of the first frame image and the slice position P2_$j$ of the second frame image overlap each other. Region 450 is a region that is captured only in the first frame image, Region 460 is a region that is captured in both the first frame image and the second frame image, and region 470 is a region that is captured only in the second frame image. The pixel values of the combined image in region 450 and region 470 are set to the pixel values of one frame image from among the first frame image and the second frame image. The pixel values of the combined image in region 460 may be set to any pixel values from among the pixel values of the first frame image and second frame image, or may be set to an average value. A weighted average value may be used in which the weights of pixel values of the first frame image is increased for pixels on the lung apex end, and weights of pixel values of the second frame image are increased for pixels on the lung base end, in accordance with the position within region 460.

In the present embodiment there may be determined whether to generate or not a combined image, on the basis of the reliability of the positional relationship calculated in step S230. To calculate positional relationship reliability, it may be determined whether or not the reliability of at least one positional relationship between a first frame image and a second frame image is equal to or greater than a predetermined threshold value set beforehand, such that only if that is the case, the reliability of the combination position is deemed to be high, and a combined image is generated.

In the present embodiment, a combined image is generated as a result of a translation in such a manner that a slice position P1_$i$ of a first frame image and a corresponding slice position P2_$j$ of a second frame image overlap each other, but the method for generating a combined image is not limited thereto. For instance, in a case where positions of pixels, not slice positions, are calculated as the combination position information, a second deformation image is deformed and combined in such a manner that pixels overlap at the combination position. Also in the case of generation of a combined image through translation, the second frame image may be deformed and thereafter combined, on the basis of an image similarity degree, so that predetermined segments match, such as a body surface position or a bronchi branch position.

Figure 5:
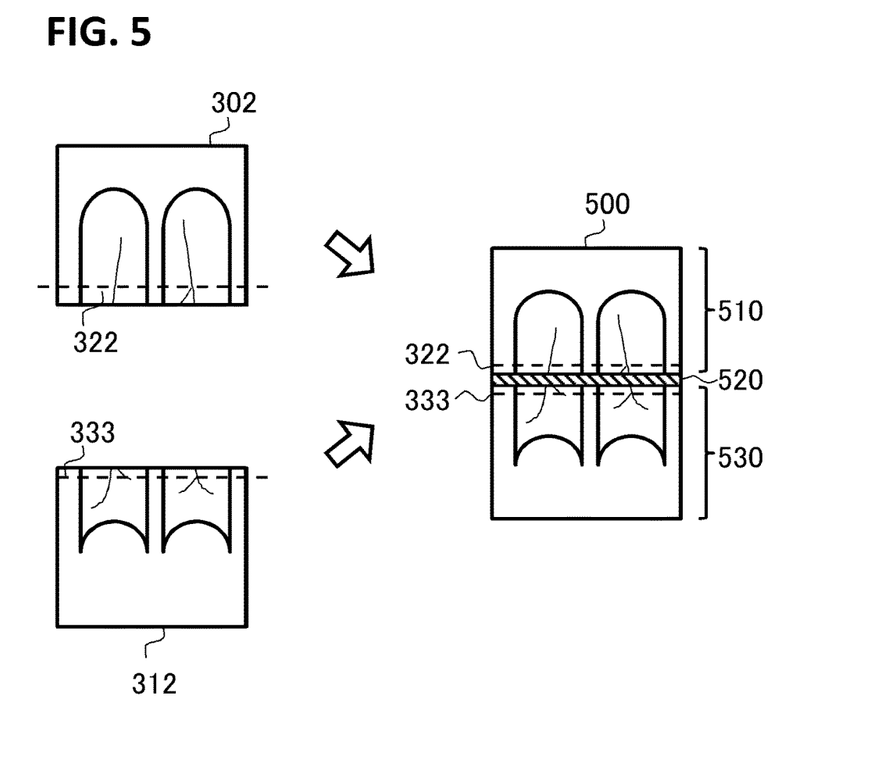
FIG. 5 is a diagram illustrating an example of a combination position in an embodiment.

An explanation follows next on a method for generating a combined image of a case in which there is no overlap region between the first frame image and the second frame image. In FIG. 3, in the case of generation of a combined image so as to maintain the positional relationship between slice position 322 of image 302 and slice position 333 of image 312, a region outside the imaging range is generated on the combined image, since there is no overlap region between the slices of image 302 and image 312. In this case, a combined image can be generated through filling of the pixel values of a region outside the imaging range with a predetermined padding value. FIG. 5 illustrates an image 500 resulting from combining image 302 and image 312. Region 510 is a region that is captured only in the first frame image, and region 530 is a region that is captured only in the second frame image. Region 520 in between is a region, outside the imaging range, in which no frame image is captured, and that is filled with a padding value.

A combined image in a plurality of frames can be generated also in a case where there is no overlapping imaging region between corresponding frame images. Time-series combined images including the entirety of a region to be observed can be thus acquired.

(S260: Image Display) In step S260, the display control unit 170 displays the combined image generated in step S240 on the display unit 12.

Processing of displaying the combined image in the present step need not necessarily be performed, and for instance a configuration may be adopted wherein the generated combined image is stored in a memory, not shown, or is outputted to the data server 11.

As described above, also in the case in the present embodiment where there is no overlap region between frame images associated as a same phase, two moving images can be properly combined, and a moving image can be generated that allows observing the entirety of the region to be observed.

Variation

In the present embodiment an example has been explained of an instance where third registration information which is a combination position between a first frame image and a second frame image at a predetermined frame is calculated indirectly using reference registration information, first registration information and second registration information.

However, the method for calculating a combination position is not limited thereto. In a case for instance where an overlap region is present between two frame images, a final combination position may be calculated on the basis of both a combination position (first combination position) worked out as a result of a direct comparison of two frame images, and a combination position (second combination position) calculated indirectly in accordance with the above method. The second combination position (third registration information) is calculated through integration of reference registration information, first registration information and second registration information. Accordingly, errors in the second combination position may be large due to accumulation of errors included in the foregoing information. The second combination position may therefore be taken as an initial value, and the first combination position may then be searched around that initial value. Hence, a rough combination position can be set as an initial value, and as a result the search range can be restricted, and thus an effect is elicited of stabilizing search processing.

A combination position of higher registration reliability from among a first combination position and a second combination position may be outputted as final combination position information. Positioning reliability can be evaluated on the basis of the second derivative value of registration information, as described above. Instead of selecting a combination position of high reliability, a weighted average of the first combination position and the second combination position, obtained using weights in accordance with reliability, may be outputted herein as the final combination position. Alternatively, a first combination position may be calculated, and a second combination position may be calculated and used, only for frame images of low combination position reliability. Also, a second combination position may be calculated first, whereupon a first combination position may be calculated and used for frames of low combination position reliability.

In the present embodiment the imaging object is human lungs, but any other object such as the heart, stomach, intestines or joints may serve as the object, provided that the object performs a periodic motion. Besides humans, also animals, plants, machinery and the like may be targeted in the present embodiment. In the above examples, the entirety of the object is captured by being divided into two moving images, but the object may be divided into three or more moving images. Positioning of three or more moving images may be accomplished for instance in such a manner that of each of two moving images having an overlap region are aligned as described above. The present embodiment is aimed at a three-dimensional moving image, but a two-dimensional moving image may also be targeted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-86506, filed on Apr. 26, 2019, which is hereby incorporated by reference herein in its entirety.

What is claimed is:
1. An image processing apparatus, comprising:
at least one memory; and
at least one processor which function as:
a first acquisition unit configured to acquire a first moving image and a second moving image resulting from imaging, in different imaging ranges, an object that performs a periodic motion between a first state and a second state;
an association unit configured to acquire a frame image pair by selecting respective frame images having mutually corresponding phases, from a plurality of first frame images that make up the first moving image and a plurality of second frame images that make up the second moving image;
a second acquisition unit configured to acquire, as a first reference image and a second reference image respectively, a first frame image and a second frame image each including at least a partial region of the object, as an overlap region, and having mutually different phases; and
a third acquisition unit configured to acquire registration information for performing registration of the frame image pair,
wherein the third acquisition unit is further configured to:
acquire first registration information being registration information between a first image of interest, which is the first frame image in the frame image pair, and the first reference image;
acquire second registration information being registration information between a second image of interest, which is the second frame image in the frame image pair, and the second reference image;
acquire reference registration information being registration information between the first reference image and the second reference image; and
acquire third registration information being registration information between the first image of interest and the second image of interest, based on the first registration information, the second registration information and the reference registration information.

2. The image processing apparatus of claim 1, wherein the second acquisition unit is further configured to select, as the first reference image and the second reference image respectively, a first frame image and a second frame image for which a size of the overlap region is maximum.

3. The image processing apparatus of claim 1, wherein the second acquisition unit is further configured to select a first frame image corresponding to the first state, as the first reference image, and select a second frame image corresponding to the second state, as the second reference image.

4. The image processing apparatus of claim 1, wherein the second acquisition unit is further configured to:
   select, as the first reference image, a first frame image of a phase of interest corresponding to a state between the first state and the second state, or a first frame image of a phase closer to the first state than the phase of interest; and
   select, as the second reference image, a second frame image of the phase of interest or a second frame image of a phase closer to the second state than the phase of interest.

5. The image processing apparatus of claim 4, wherein the second acquisition unit is further configured to:
   select, as the first reference image, a frame image whose similarity degree to the first frame image of the phase of interest is highest, from among first frame images of a phase closer to the first state than the phase of interest; and
   select, as the second reference image, a frame image whose similarity degree to the second frame image of the phase of interest is highest, from among second frame images of a phase closer to the second state than the phase of interest.

6. The image processing apparatus of claim 4, wherein the second acquisition unit is further configured to:
   select, as the first reference image, a frame image whose similarity degree to the second frame image of the phase of interest is highest, from among first frame images of a phase closer to the first state than the phase of interest, or the first frame image of the phase of interest; and
   select, as the second reference image, a frame image whose similarity degree to the first frame image of the phase of interest is highest, from among second frame images of a phase closer to the second state than the phase of interest, or the second frame image of the phase of interest.

7. The image processing apparatus of claim 6, wherein the similarity degree between the first frame images and the second frame images is evaluated based on an image similarity degree between mutually corresponding slice images included in the first frame images and the second frame images.

8. The image processing apparatus of claim 4, wherein the second acquisition unit is further configured to:
   select, as the first reference image, a frame image whose image quality is highest from among first frame images of a phase closer to the first state than the phase of interest; and
   select, as the second reference image, a frame image whose image quality is highest from among second frame images of a phase closer to the second state than the phase of interest.

9. The image processing apparatus of claim 4, wherein the phase of interest is a phase corresponding to an intermediate state between the first state and the second state.

10. The image processing apparatus of claim 4, wherein the second acquisition unit is further configured to select the first reference image and the second reference image using at least two of evaluation factors from among: a size of an overlap region of the first frame images and the second frame images, a similarity degree to the frame images of the phase of interest, and image quality.

11. The image processing apparatus of claim 1,
   wherein the second acquisition unit is further configured to select at least either one of a plurality of reference images each being the first reference image and a plurality of reference images each being the second reference image; and
   wherein the third acquisition unit is further configured to acquire a plurality of provisional registration information items between the first image of interest and the second image of interest, in accordance with a combination of the first reference image and the second reference image, and to determine the third registration information based on the plurality of provisional registration information items.

12. The image processing apparatus of claim 11, wherein the third acquisition unit is further configured to determine, as the third registration information, a provisional registration information item having highest reliability from among the plurality of provisional registration information items.

13. The image processing apparatus of claim 12, wherein a reliability of the registration information items is determined based on a value of a second derivative over consecutive frames.

14. The image processing apparatus of claim 11, wherein the third acquisition unit is further configured to determine, as the third registration information, an average of the plurality of provisional registration information items.

15. The image processing apparatus of claim 1, further comprising a generation unit configured to generate, based on the third registration information, a combined image through registration of the first frame image and the second frame image included in the frame image pair.

16. The image processing apparatus of claim 15, wherein in a case where there is an overlap region between the first frame image and the second frame image included in the frame image pair, the generation unit generates the combined image by working out a combination position based on a comparison between the first frame image and the second frame image, from a periphery of a combination position based on the third registration information as a search range.

17. The image processing apparatus of claim 15, wherein in a case where there is an overlap region between the first frame image and the second frame image included in the frame image pair, the generation unit generates the combined image by combining the first frame image and the second frame image at a combination position of higher reliability, from among a combination position based on the third registration information and a combination position worked out through comparison between the first frame image and the second frame image.

18. The image processing apparatus of claim 1,
   wherein the object is a lung,
   wherein the first moving image is a moving image resulting from imaging a lung apex end of the lung,
   wherein the second moving image is a moving image resulting from imaging a lung base end of the lung,
   wherein the first state is a maximal expiratory position, and wherein the second state is a maximal inspiratory position.

19. A computer-implemented image processing method, comprising:
a first acquisition step of acquiring a first moving image and a second moving image resulting from imaging, in different imaging ranges, an object that performs a periodic motion between a first state and a second state;
an association step of acquiring a frame image pair by selecting respective frame images having mutually corresponding phases, from a plurality of first frame images that make up the first moving image and a plurality of second frame images that make up the second moving image;
a second acquisition step of acquiring, as a first reference image and a second reference image respectively, a first frame image and a second frame image each including at least a partial region of the object, as an overlap region, and having mutually different phases; and
a third acquisition step of acquiring registration information for performing registration of the frame image pair,
wherein the third acquisition step includes:
a step of acquiring first registration information being registration information between a first image of interest which is the first frame image in the frame image pair and the first reference image;
a step of acquiring second registration information being registration information between a second image of interest which is the second frame image in the frame image pair and the second reference image;
a step of acquiring reference registration information being registration information between the first reference image and the second reference image; and
a step of acquiring third registration information being registration information between the first image of interest and the second image of interest, based on the first registration information, the second registration information and the reference registration information.

20. A non-transitory computer-readable medium storing a program which, when executed by a computer, causes the computer to execute an image processing method comprising:
a first acquisition step of acquiring a first moving image and a second moving image resulting from imaging, in different imaging ranges, an object that performs a periodic motion between a first state and a second state;
an association step of acquiring a frame image pair by selecting respective frame images having mutually corresponding phases, from a plurality of first frame images that make up the first moving image and a plurality of second frame images that make up the second moving image;
a second acquisition step of acquiring, as a first reference image and a second reference image respectively, a first frame image and a second frame image each including at least a partial region of the object, as an overlap region, and having mutually different phases; and
a third acquisition step of acquiring registration information for performing registration of the frame image pair,
wherein the third acquisition step includes
a step of acquiring first registration information being registration information between a first image of interest which is the first frame image in the frame image pair and the first reference image;
a step of acquiring second registration information being registration information between a second image of interest which is the second frame image in the frame image pair and the second reference image;
a step of acquiring reference registration information being registration information between the first reference image and the second reference image; and
a step of acquiring third registration information being registration information between the first image of interest and the second image of interest, based on the first registration information, the second registration information and the reference registration information.

* * * * *